Sept. 30, 1924.                                     1,510,204
                        C. BAZZILL
                         TRAP NEST
                    Filed May 19, 1923          3 Sheets-Sheet 1
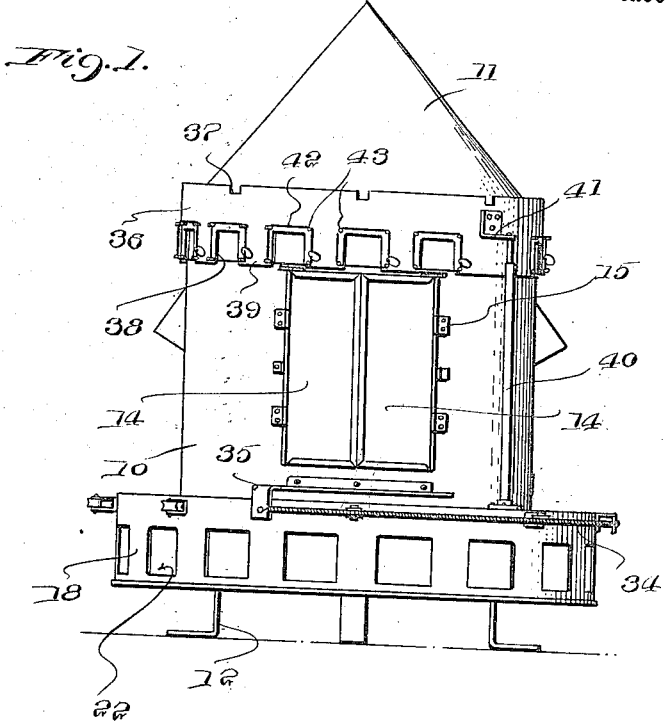
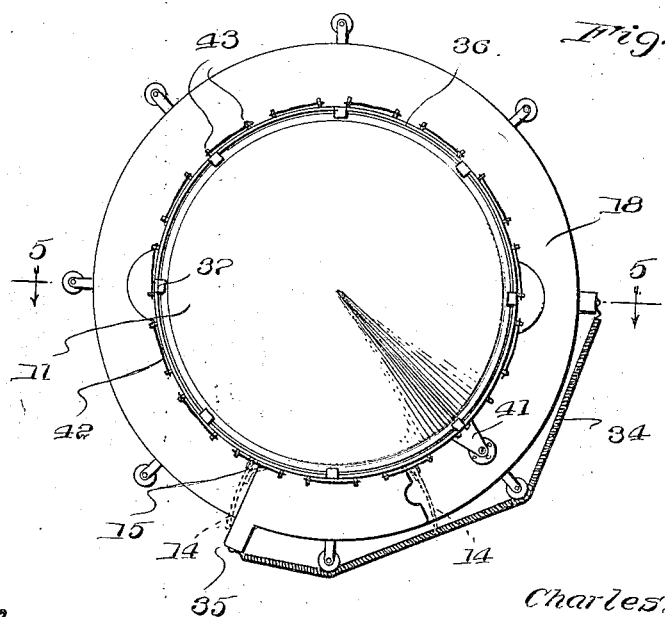
Charles Bazzill
INVENTOR
BY Victor J. Evans
ATTORNEY
WITNESS:

Sept. 30, 1924.

C. BAZZILL

TRAP NEST

Filed May 19, 1923

Charles Bazzill
INVENTOR

BY Victor J. Evans
ATTORNEY

WITNESS:

Sept. 30, 1924.
C. BAZZILL
1,510,204
TRAP NEST
Filed May 19, 1923
3 Sheets-Sheet 3
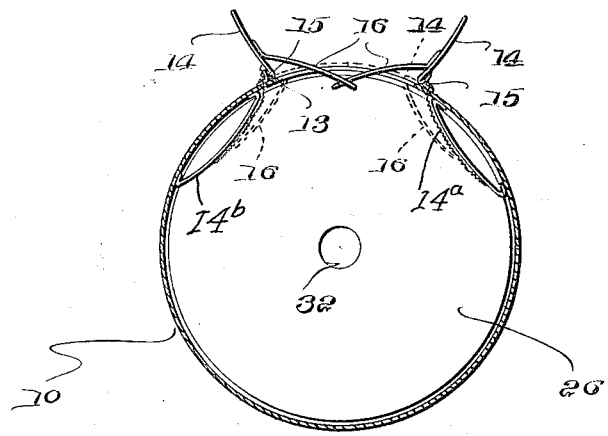
Fig. 4.
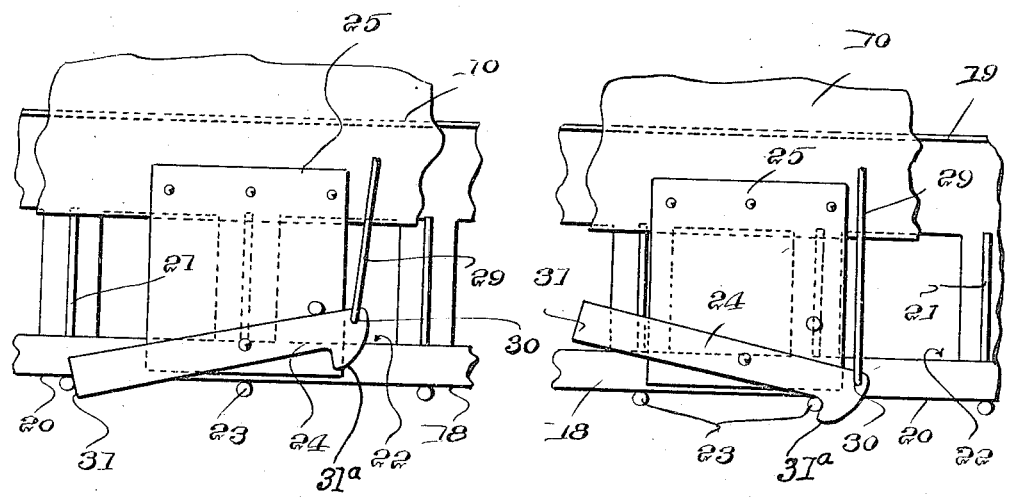
Fig. 6.
Fig. 7.
Charles Bazzill
INVENTOR
BY Victor J. Evans
ATTORNEY
WITNESS:

Patented Sept. 30, 1924.

1,510,204

UNITED STATES PATENT OFFICE.

CHARLES BAZZILL, OF TRINIDAD, COLORADO.

TRAP NEST.

Application filed May 19, 1923. Serial No. 640,217.

*To all whom it may concern:*

Be it known that I, CHARLES BAZZILL, a citizen of the United States, residing at Trinidad, in the county of Las Animas and State of Colorado, have invented new and useful Improvements in Trap Nests, of which the following is a specification.

This invention relates to devices for use in the raising of poultry and has for its object the provision of a novel trap nest which will automatically disclose which hens are layers and which are useless.

An important and more specific object is the provision of a trap nest equipped with means for distributing eggs laid by successive hens in certain individual compartments which correspond to elastic identifying members which are engaged upon the neck of the hen as the hen leaves the nest, the co-relation of these marking tags with the egg compartments giving efficient data as to the layers and non-layers so that the flock may be weeded out by the removal of the drones.

Another object is the provision of a device of this character which is of rotary nature and which is spring operated to bring the successive egg compartments in a position to receive eggs laid in the discharge chute so that error in checking up will be almost impossible.

Still another object is the provision of a trap nest which will be simple and inexpensive in manufacture, sanitary, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the complete device,

Figure 2 is a top plan view thereof,

Figure 4 is a horizontal section on the line 4—4 of Figure 5,

Figures 6 and 7 are detail views of the latch and its cooperating elements.

Figure 3:
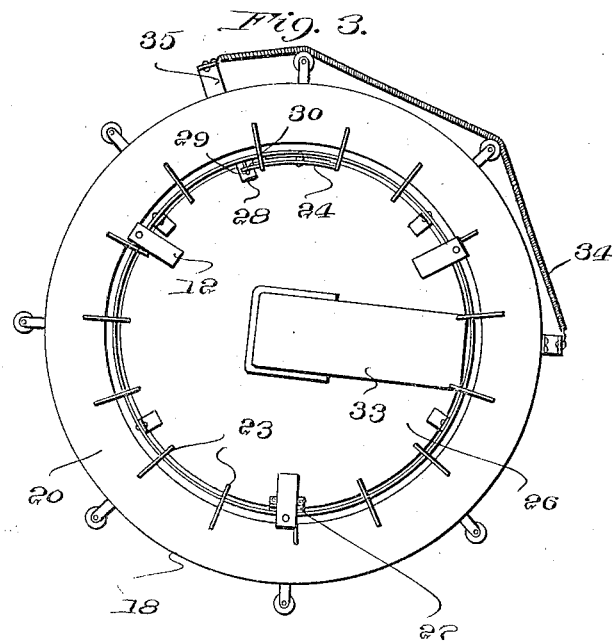
Figure 3 is a bottom plan view.
Figure 5:
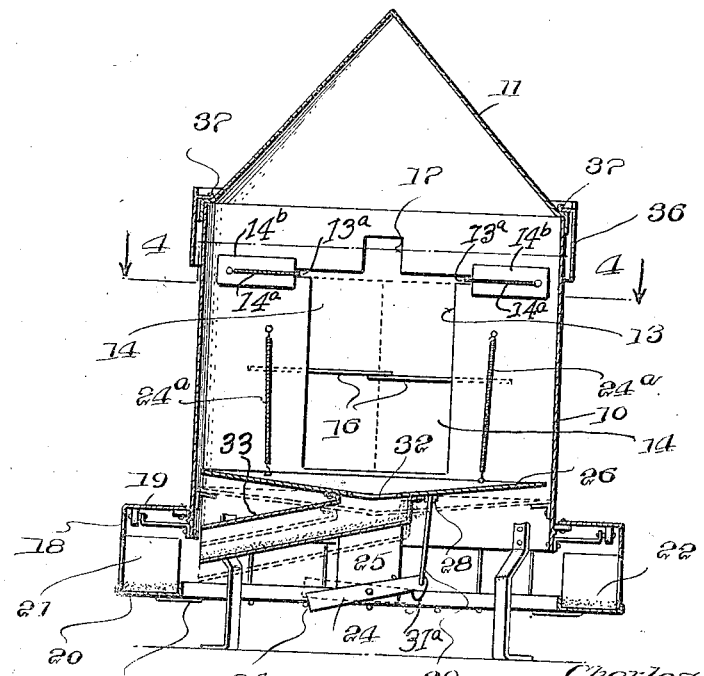
Figure 5 is a longitudinal section on the line 5—5 of Figure 2.

Referring more particularly to the drawings I have shown my device as comprising an upstanding cylindrical casing 10 open at its bottom and closed at its top by a conical roof 11. This casing is supported upon any desired number of legs 12 which will hold the bottom somewhat elevated above the ground, floor or other surface. At one point in its periphery the casing 10 is formed with a door opening 13 normally closed by a pair of doors 14 which are hinged at 15 and which carry curved actuating arms 16 for a purpose to be described. The opening 17 is immediately above and may be considered a part of the opening 13. At the upper corners of the opening 13 are slots 13$^a$. Connected with the doors 14 near their upper corners are springs 14$^a$ which bear against and which are secured to curved plates 14$^b$ mounted against the inner wall of the casing. These springs pass through the slots or notches 13$^a$ and are so arranged as to hold the doors in either open or closed position.

Surrounding and rotatably mounted upon the lower end of the casing is a ring like structure 18 including upper and lower members 19 and 20 respectively which have the space between them divided by partitions 21 into a plurality of compartments 22 designed for the reception of eggs. Carried by the lower ring member 20 and projecting inwardly toward the center is a series of pins 23 with which co-operates a pivoted latch 24 mounted upon a supporting plate 25. The latch is held in normal position by springs 24$^a$.

The bottom of the casing 10 is normally closed by a plate 26 which is hinged at 27 at a point most remote from the door opening 13. At a diametrically opposite point this closure plate carries a lug or ear 28 with which is connected one end of a rod 29 which has its other end pivotally connected with the latch 24 as shown at 30. The springs 24$^a$ hold the bottom plate normally in its uppermost position. The end 31 of the latch acts as a stop, as will be described, and the other end is of hook shape to define a shoulder 31$^a$. The bottom closure plate 26 is provided with a central hole 32 leading into an inclined egg discharge chute 33 which may preferably be lined with felt or other soft padding which will reduce danger of breaking eggs rolling therealong. The outer end of this chute is designed to discharge eggs into the successive compartments 22. It should be mentioned in passing that the rotatable egg compartment member is intended to be placed under tension by means of a spring 34, which has one end secured to the egg compartment member and which has its other end secured to an outwardly extending bracket 35 carried by the casing, the purpose being that by rotating the egg carrier the spring will be placed under such tension that there is quite a strong tendency for the egg carrier to rotate, such rotation being permitted whenever the latch 24 is moved out of engagement with the successive pins 23.

Rotatably mounted upon the top of the casing is a ring 36 prevented from downward displacement by lugs 37 thereon engaging against the upper edge of the wall of the casing. This ring 36 is formed with openings 38 designed to register successively with the opening 17. The openings 38 alternate with solid tongues 39 which are for the purpose of closing the opening 17 whenever such is desired depending upon the circumstances of the particular case. The ring 36 is secured with respect to the egg carrier by means of an elongated post 40 which has one end secured to the carrier and which has its other end secured to an ear 41 on the ring 36 on the casing. When the device has been used by a number of hens corresponding to the number of egg compartments, it is to be noted that one hinged door will come opposite the post 40 and this post then operates to prevent the doors from swinging open.

In order to mark the individual hens subsequent to laying, I provide an elastic band 42 designed to be engaged about the neck of the fowl and this band is held upon pins or posts 43 at the corners of the openings 38.

In the operation it will be seen that initially the control spring must be placed under tension, an act which is easily accomplished by holding the casing stationary and rotating the egg carrier to bring the desired one of the compartments therein in alignment with the discharge chute. The doors are initially open and held so by the springs 14ᵃ, and the arms 16 obstruct the opening. When a hen steps through the doors 14 and enters the nest, the pressure of her body against the arms 16 causes the doors to swing shut behind her, and the weight of the hen upon the free end of the plate 20 causes this plate to swing downwardly. At this time the resultant downward movement imparted to the rod 29 causes the latch 24 to swing upon its pivot, so that the end 31 will be out of the path of pins 23 while the shoulder 31 moves into their path. This permits the rotary member to turn one step or until the next pin engages the stop shoulder 31ᵃ. When an egg is laid it rolls down the discharge chute into one of the compartments and when the hen subsequently steps out of the nest the bottom plate will return to its normal position, the result being that the springs 24ᵃ will move the latch 24 so that the shoulder 31ᵃ will disengage the pin 23 held thereagainst while the end 31 will move down into the path of the pins and be engaged by the next one. The rotary member thus moves one step to bring the next successive egg compartment in registration with the outlet end of the egg chute. There are two pins for each egg compartment. When leaving the nest the hen will naturally pass her head through the small opening 17 exposed at the top of the door opening and will then, according to instinct press outwardly on the doors which will result in swinging them to open position, the springs 14ᵃ then holding them open. It is to be noted that the elastic bands are carried by the upper rotary ring 36 and that they are disposed about the successive openings or cut away portions 38. When the hen places her head through the opening and presses outwardly on the doors the band will be disengaged from its supporting pins 43 and will remain on the neck of the fowl. It is intended that these bands be numbered or otherwise marked to distinguish them one from another and that the various egg compartments be correspondingly numbered so that the operator or attendant may ascertain definitely which are the laying and which are the idle hens in the flock.

From the foregoing description and a study of the drawings it will be apparent that I have thus provided a simply constructed and consequently inexpensive trap nest which will be very efficient for the purpose specified and which on account of the fewness of the parts should have a long life.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A trap nest comprising a cylindrical casing having a door opening and a relatively small opening thereabove, hinged doors normally closing the door opening, a rotatable egg compartment carried by the lower end of the casing, a bottom hingedly mounted witihn the casing and having an opening, a discharge chute beneath the bottom receding from the opening and designed to discharge eggs into successive compartments, a ring member rotatably mounted upon the upper end of the casing and formed with cut out portions corresponding to said egg compartments and adapted to register with said relatively small opening, and means for holding a series of elastic bands around said cut out portions, and means operated by depression of said bottom member for rotating the egg carrier step by step.

2. A trap nest comprising a cylindrical casing having a closed top and an open bottom, said casing being formed with a door opening and a relatively small opening leading thereinto, a pair of hingedly mounted doors normally closing the door opening, an egg carrier rotatably mounted upon the lower end of the casing and divided into compartments, a bottom plate movably mounted within the casing, a latch device carried by the casing, an operative connection between said movable bottom and said latch device, spring means tending to rotate the egg carrier in one direction, a plurality of stops carried by the carrier and co-operating with said latch for holding the carrier at a selected position, a ring rotatably mounted upon the upper end of the casing and formed with cut out portions successively registering with said relatively small opening, and an elastic band surrounding each cut out portion.

3. In a trap nest, a casing having a door opening and a relatively small opening thereabove, hen operated doors for closing the door opening, a ring member rotatably mounted upon the upper end of the casing and having openings adapted to register with said small opening, means for holding a series of marking elements around said last named openings, a rotatable egg carrier at the bottom of the casing moving synchronously with said ring.

In testimony whereof I affix my signature.

CHARLES BAZZILL.